(12) United States Patent
Hyndman et al.

(10) Patent No.: US 7,569,137 B2
(45) Date of Patent: Aug. 4, 2009

(54) PROCESS AND APPARATUS FOR TREATING TAILINGS

(75) Inventors: Alexander William Hyndman, North Saanich (CA); John Patrick Ringstrom, Calgary (CA); John Sharpe, Calgary (CA); Douglas Robert Bartlett, Calgary (CA); W. Scott Hindle, Calgary (CA); Chris L. Grant, Calgary (CA)

(73) Assignee: Fort Hills Energy L.P. (CA)

( * ) Notice: Subject to any disclaimer, the term of this patent is extended or adjusted under 35 U.S.C. 154(b) by 239 days.

(21) Appl. No.: 10/822,507

(22) Filed: Apr. 12, 2004

(65) Prior Publication Data

US 2005/0150844 A1 Jul. 14, 2005

(30) Foreign Application Priority Data

Jan. 8, 2004 (CA) .................................. 2454942

(51) Int. Cl.
*C10G 1/04* (2006.01)

(52) U.S. Cl. ....................................... 208/390; 208/428
(58) Field of Classification Search ................. 210/750; 208/390, 391, 428
See application file for complete search history.

(56) References Cited

U.S. PATENT DOCUMENTS

| | | | |
|---|---|---|---|
| 4,035,282 A | 7/1977 | Stuchberry et al. | |
| 4,120,775 A | 10/1978 | Murray et al. | |
| 4,324,652 A | 4/1982 | Hack | |
| 4,368,112 A * | 1/1983 | Thompson et al. | 208/31 |
| 4,425,227 A | 1/1984 | Smith | |
| 4,545,892 A | 10/1985 | Cymbalisty et al. | |
| 4,722,782 A | 2/1988 | Graham et al. | |
| 5,039,227 A | 8/1991 | Leung et al. | |
| 5,143,598 A | 9/1992 | Graham et al. | |
| 5,264,118 A | 11/1993 | Cymerman et al. | |
| 5,645,714 A | 7/1997 | Strand et al. | |
| 5,954,277 A | 9/1999 | Maciejewski et al. | |
| 6,007,708 A | 12/1999 | Allcock et al. | |
| 6,007,709 A | 12/1999 | Duyvesteyn et al. | |
| 6,076,753 A | 6/2000 | Maciejewski et al. | |

FOREIGN PATENT DOCUMENTS

| | | |
|---|---|---|
| CA | 1027501 | 3/1978 |
| CA | 1267860 | 4/1990 |
| CA | 1293465 | 12/1991 |
| CA | 2053016 | 5/1992 |
| CA | 2055213 | 8/1996 |
| CA | 2029795 | 11/1996 |

(Continued)

*Primary Examiner*—Glenn Caldarola
*Assistant Examiner*—Randy Boyer
(74) *Attorney, Agent, or Firm*—Sheridan Ross P.C.

(57) ABSTRACT

Processes and apparatus for the treatment of product streams from mineral processing operations, including the treatment of tailings which result from oil sand processing operations. The processes and apparatus relate to the recovery of a diluent solvent from bitumen froth tailings and to the thickening of tailings from a bitumen froth stream and a middlings stream resulting from an oil sand extraction process. In one aspect the processes and apparatus relate particularly to the recycling of product streams to maximize process efficiencies. In a second aspect the processes and apparatus relate particularly to the thickening of tailings to produce an underflow component, a clarified overflow component and an unclarified overflow component.

16 Claims, 4 Drawing Sheets

FOREIGN PATENT DOCUMENTS

| | | |
|---|---|---|
| CA | 2191517 | 5/1998 |
| CA | 2021185 | 9/1998 |
| CA | 2200899 | 9/1998 |
| CA | 2232929 | 9/1998 |
| CA | 2149737 | 3/1999 |
| CA | 2195604 | 11/1999 |
| CA | 2350907 | 5/2000 |
| GB | 2 044 796 | 10/1980 |

* cited by examiner

PROCESS AND APPARATUS FOR TREATING TAILINGS

This application claims priority to Canadian Patent Application No. 2,454,942 filed on Jan. 8, 2004, which is hereby incorporated by reference.

TECHNICAL FIELD

This invention relates to processes and apparatus for the treatment of product streams which result from mineral processing operations, including the treatment of tailings which result from oil sand processing operations.

BACKGROUND OF THE INVENTION

Oil sand extraction processes are used to liberate and separate bitumen from oil sand so that the bitumen can be further processed to produce synthetic crude oil. Numerous oil sand extraction processes have been developed and commercialized, many of which involve the use of water as-a processing medium. One such water extraction process is the Clark hot water extraction process (the "Clark Process"), which was one of the first commercially successful oil sand extraction processes.

A water extraction process such as the Clark Process typically requires that mined oil sand be conditioned for extraction by being crushed to a desired lump size and then combined with water and perhaps other agents to form a conditioned slurry of water and crushed oil sand. In the Clark Process, the water used is "hot" (about 95 degrees Celsius) and an amount of sodium hydroxide (caustic) is added to the slurry to adjust the slurry pH upwards, which enhances the liberation and separation of bitumen from the oil sand. Other water extraction processes may have other temperature requirements and may include other conditioning agents which are added to the oil sand slurry.

The process will typically result in the production of a number of product streams, some of which are typically disposed of as waste. For example, in the Clark Process, these streams include a bitumen froth stream comprising bitumen, asphaltenes, fine particulate mineral solids and water, a middlings stream comprising bitumen, asphaltenes, fine particulate mineral solids and water, and a coarse tailings stream consisting primarily of coarse particulate mineral solids and water. The bitumen froth stream and the middlings stream are typically processed further, both to recover and purify bitumen and to render the fine solids more readily disposable and less of an environmental risk. The coarse tailings stream is not typically processed further, since the coarse particulate solids are relatively easy to dispose of and do not typically present a significant environmental risk.

The bitumen froth stream is processed in a froth treatment process to separate water and solids from the bitumen and to encourage the precipitation of asphaltenes out from the bitumen. The processed bitumen froth stream is then sent for further processing to produce synthetic crude oil. The fine solids and precipitated asphaltenes recovered from the bitumen froth stream are typically ultimately disposed of in tailings ponds.

The middlings stream is processed to recover additional bitumen and to recover water from the fine solids and any precipitated asphaltenes. The fine solids and precipitated asphaltenes recovered from the middlings stream are typically ultimately disposed of in tailings ponds.

The coarse solids previously obtained from the coarse tailings stream may be used to form dykes or berms to contain the fine solids. The water which is recovered from the bitumen froth stream and from the middlings stream may be recycled for re-use in various stages of the processes described above in order to recover valuable heat contained in the water, thus reducing the energy requirements of the various processes.

The froth treatment process reduces the fine solids, asphaltene and water content of the bitumen froth. The froth treatment process typically involves the addition of an organic solvent to dilute the bitumen. The solvent is typically either a naphtha (aromatic) solvent or a paraffinic (saturated aliphatic) solvent. The diluted bitumen froth is typically subjected to a multistage separation process to separate a diluted tailings component (including fine solids and precipitated asphaltenes) from a diluted bitumen component. The diluted bitumen component and the diluted tailings component produced by the multistage separation process are each subsequently subjected to a solvent recovery process.

Recovery of the solvent from the diluted bitumen component is required before the bitumen may be delivered to a refining facility for further processing. Recovery of the solvent from the diluted tailings component is also desirable for several reasons, since any solvent remaining in the tailings will be discarded with the tailings in a tailings pond. First, a loss of solvent becomes an unnecessary expenditure of the extraction process. Second, any solvent remaining in the tailings pond becomes an environmental concern, Third, water in a tailings pond may be recycled and any solvent remaining in this water may create explosive conditions when reheated for re-use in the various processes.

The middlings stream is processed for two main reasons. The first reason to process the middlings stream is to recover amounts of bitumen which remain suspended in the middlings stream. This bitumen is recovered both to maximize the recovery of bitumen from the oil sand and to reduce the amount of bitumen contained in the middlings stream. Since the water recovered from the middlings stream may be heated and recycled for re-use, bitumen remaining in the water may foul heat exchangers and cause a need for increased maintenance of plant equipment.

The second reason to process the middlings stream is to recover water from the middlings stream so that the middlings can be more efficiently disposed of in a tailings pond. The middlings stream contains most of the fine solids from the oil sand, which fine solids tend to settle and consolidate very slowly when their water content is high. Complete settlement and consolidation of the fine material suspended in water may take many years. Furthermore, water not recovered from the middlings stream creates a requirement for makeup water which decreases the overall efficiency of the various processes.

Processes and apparatus relating to the treatment of bitumen froth are described in the prior art. These processes and apparatus include those described in Canadian Patent No. 1,027,501 (Simmer), Canadian Patent No. 1,267,860 (Hann), Canadian Patent No. 1,293,465 (Hyndman et al), Canadian Patent No. 2,021,185 (Tipman et al), Canadian Patent No. 2,149,737 (Tipman et al), Canadian Patent Application No. 2,200,899 (Tipman et al), Canadian Patent Application No. 2,232,929 (Power et al), Canadian Patent Application No. 2,350,907 (Duyvestyn et al), U.S. Pat. No. 4,035,282 (Stuchberry et al) and U.S. Pat. No. 6,007,709 (Duyvestyn et al).

Other bitumen extraction and related processes include those described in Canadian Patent Application No. 2,053,016 (Green et al), Canadian Patent No. 2,055,213 (Wallace et al), U.K. Patent Application No. 2,044,796 (Robinson et al), U.S. Pat. No. 4,324,652 (Hack), U.S. Pat. No. 4,425,227

(Smith), U.S. Pat. No. 4,545,892 (Cymbalisty et al), U.S. Pat. No. 4,722,782 (Graham et al) and U.S. Pat. No. 5,143,598 (Graham et al).

Processes and apparatus relating to the preparation of oil sand slurries and conditioning of oil sand slurries include those described in Canadian Patent No. 2,029,795 (Cymerman et al), Canadian Patent Application No. 2,191,517 (Tipinan), Canadian Patent No. 2,195,604 (Maciejewski et al), U.S. Pat. No. 4,120,775 (Murray et al), U.S. Pat. No. 5,039,227 (Leung et al), U.S. Pat. No. 5,264,118 (Cymerman et al), U.S. Pat. No. 5,954,277 (Maciejewski et al), U.S. Pat. No. 6,007,708 (Allcock et al) and U.S. Pat. No. 6,076,753 (Maciejewski et al).

There remains in the art a need for increased efficiency and effectiveness in treating both the bitumen froth stream and the middlings stream which are produced in the processing of oil sand.

SUMMARY OF THE INVENTION

The present invention relates to the treatment of tailings which result from mineral processing operations, such as oil sand processing operations. The tailings comprise water and particulate mineral solids and residual bitumen and asphaltenes. The tailings preferably comprise fine particulate solids and precipitated asphaltenes and are preferably produced as a tailings component from a bitumen froth or from a middlings stream. In a first aspect, the invention relates to a process for treating a bitumen froth, wherein the process comprises mixing a solvent with the bitumen froth to provide a diluted bitumen froth, wherein the process comprises a separating step for separating the diluted bitumen froth into a diluted bitumen component comprising bitumen and solvent and a diluted tailings component comprising water, particulate solids, asphaltenes, and residual bitumen and solvent, and wherein the process comprises a solvent recovering step for separating the diluted tailings component into a recovered solvent component and a solvent recovered tailings component, the improvement which comprises:

(a) introducing the diluted tailings component into a solvent recovery apparatus following the separating step;

(b) discharging the solvent recovered tailings component from the solvent recovery apparatus as a discharged solvent recovered tailings component; and (c) returning a portion of the discharged solvent recovered tailings component to the solvent recovery apparatus as a returned solvent recovered tailings component.

The reasons for returning a portion of the discharged solvent recovered tailings component to the solvent recovery apparatus are: recovering heated water for re-use in the process; increasing the flowrate of liquids through the solvent recovery apparatus in order to inhibit the accumulation of an asphaltene mat which could plug the solvent recovery apparatus; suppressing foam which may be formed in the solvent recovery apparatus; and providing an opportunity to liberate and recover additional solvent from a returned portion of the discharged solvent recovered tailings component. As a result, any amount of recycling will be advantageous and the ratio by volume of the returned solvent recovered tailings component to the discharged solvent recovered tailings component preferably may be any ratio which is less than 1:1. More preferably the ratio is greater than about 1:2. More preferably the ratio is no greater than about 5:6.

The solvent recovery apparatus may be comprised of a single solvent recovery unit or a plurality of solvent recovery units configured in parallel or in series. Preferably the solvent recovery apparatus is comprised of a plurality of solvent recovery units configured in series.

Where the solvent recovery apparatus is comprised of a plurality of solvent recovery units configured in series, the returned solvent recovered tailings component may be comprised of a returned portion of the solvent recovered tailings component discharged from one or a plurality of the solvent recovery units. Preferably the returned portion of a solvent recovered tailings component discharged from a solvent recovery unit is returned to the same solvent recovery unit. Alternatively, the returned portion of a solvent recovered tailings component discharged from a solvent recovery unit may be returned to a different solvent recovery unit or to more than one solvent recovery unit.

As previously stated, the solvent recovery apparatus is preferably comprised of two or more solvent recovery units configured in series. In one embodiment, a returned portion of the solvent recovered tailings component discharged from a first solvent recovery unit is returned to the first solvent recovery unit. Optionally, a returned portion of the solvent recovered tailings component discharged from one or more subsequent solvent recovery units is also returned to the same solvent recovery unit from which it was discharged.

The ratio by volume of the returned portion of a discharged solvent recovered tailings component to the discharged solvent recovered tailings component from a particular solvent recovery unit is preferably greater than about 1:2, and more preferably is no greater than about 5:6.

Preferably a moderated pressure is provided in the solvent recovery apparatus. Preferably the moderated pressure is between about 1 atmosphere and about 2 atmospheres, which generally represents a pressure reduction prior to the solvent recovery apparatus. The reasons for providing a moderated pressure in the solvent recovery apparatus are first, to minimize slug formation in the transfer lines to the solvent recovery apparatus, second, to minimize transfer line erosion and third, to assist in the breaking of foam which may have been produced during previous processing of the bitumen froth or the tailings component. The moderated pressure may be provided using a pressure relief valve, pressure regulator or any other apparatus or device which is capable of providing the moderated pressure in the solvent recovery apparatus, and may be provided upstream of the solvent recovery apparatus or within the solvent recovery apparatus.

The returned solvent recovered tailings component may be returned to the solvent recovery apparatus in any suitable manner. Preferably the returned solvent recovered tailings component is exposed to shearing conditions before being returned to the solvent recovery apparatus. The reasons for exposing the returned solvent recovered tailings component to shearing conditions are first, to break up asphaltene flocs and second, to encourage further liberation of solvent from the tailings component.

The shearing conditions may be provided by mixers, pumps or similar apparatus. In a preferred embodiment, the shearing conditions are provided by utilizing a recycle pump to return the returned solvent recovered tailings component to the solvent recovery apparatus.

Preferably the process is further comprised of the step of subjecting at least a portion of the discharged solvent recovered tailings component to gravity separation, for example in a thickener, in order to produce an underflow component and an overflow component.

The separating step for separating the diluted bitumen froth into a diluted bitumen component and a diluted tailings component may comprise any suitable process which utilizes a diluent solvent. The solvent may be comprised of any suitable solvent. Preferably the solvent is an organic solvent. The organic solvent is preferably comprised of a naphtha (aromatic) solvent or a paraffinic (saturated aliphatic) solvent. Most preferably the solvent is comprised of a naphtha solvent.

The separating step may be comprised of one or a plurality of separating steps which may be configured in series or in parallel. Preferably the separating step is comprised of a plurality of separating steps performed in series. Preferably the solvent is added to a separating step which is subsequent to a first separating step. Preferably the diluted bitumen froth is removed from the separating step at a first separating step and the diluted tailing-component is removed from the separating step at a final separating step.

Preferably a portion of the thickener overflow component is-returned to the separating step as a returned thickener overflow component. The returned thickener overflow component may be distributed to one or more of the separating steps. Preferably the returned thickener overflow component is returned to a separating step which is subsequent to the first separating step.

In a preferred embodiment, the separating step is comprised of the following steps:

(a) first separating the bitumen froth into a first separating stage overflow component and a first separating stage underflow component;

(b) adding a solvent to the first separating stage underflow component to provide a diluted first separating stage underflow component;

(c) second separating the diluted first separating stage underflow component into a second separating stage overflow component and a second separating stage underflow component, wherein the second separating stage underflow component is comprised of the diluted tailings component;

(d) returning the second separating step overflow component to the first separating step so that the second separating step overflow component mixes with the bitumen froth to provide the diluted bitumen froth.

In a preferred embodiment the returned thickener overflow component is returned to the second separating step.

The separating step is preferably performed in a separator apparatus. The separator apparatus may be comprised of one or a plurality of separator units which may be configured in series or in parallel. The separator units may be comprised of any suitable apparatus, including but not limited to separator vessels or plate separators.

Preferably the separator apparatus is comprised of a plurality of separator units configured in series. Preferably the solvent is added to a separator unit which is subsequent to a first separator unit. Preferably the diluted bitumen froth is removed from the separator apparatus at the first separator unit and the diluted tailings component is removed from the separator apparatus at the final separator unit.

Preferably a portion of the thickener overflow component is returned to the separator apparatus as a returned thickener overflow component. The returned thickener overflow component may be distributed to one or more of the separator units. Preferably the returned thickener overflow component is returned to a separator unit which is subsequent to the first separator unit. In a preferred embodiment, the separator apparatus is comprised of two separator units and the returned thickener overflow component is returned to a second separator unit.

The reasons for returning the returned thickener overflow component to the separating step and the separating apparatus are first, to dilute the bitumen froth which is being separated and second, to conserve energy by using recycled clarified water from the thickening step as a water diluent rather than fresh water which may require heating.

The separating step is performed at a temperature which is dependent upon the composition of the solvent. Paraffinic solvents generally require a lower temperature for the separating step than do naphtha solvents and lighter paraffinic solvents generally require a lower temperature for the separating step than do heavier paraffinic solvents.

In the preferred embodiment where the separating step is comprised of a first separating step and a second separating step, the second separating step is preferably performed at a higher temperature than the first separating step so that the temperature of the second separating step controls the temperature at which the first separating step is performed. Preferably the temperature of the second separating step is controlled by providing a heat input to the second separating step. Preferably the heat input is provided by adding the solvent to the second separating step at a temperature which is suitable to control the operating temperature for both the second separating step and the first separating step.

In a second aspect, the invention relates to a process for treating a bitumen froth, wherein the process comprises a solvent adding step for adding a solvent to the bitumen froth to provide a diluted bitumen froth, wherein the process comprises a separating step for separating the diluted bitumen froth into a diluted bitumen component comprising bitumen and solvent and a diluted tailings component comprising water, particulate solids and residual bitumen and solvent and precipitated asphaltenes, and wherein the process comprises a solvent recovering step for separating the diluted tailings component into a recovered solvent component and a solvent recovered tailings component, the improvement which comprises:

(a) introducing the diluted tailings component into a solvent recovery apparatus following the separating step;

(b) discharging the solvent recovered tailings component from the solvent recovery apparatus; and (c) gravity separating, for example by thickening, at least a portion of the solvent recovered tailings component to produce an underflow component and an overflow component.

The second aspect of the invention may include additional features, including any or all of those features which are described above with respect to the first aspect. For example, the second aspect may include the step of returning a portion of the discharged solvent recovered tailings component to the solvent recovery apparatus as a returned solvent recovered tailings component so that features of the first aspect and the second aspect are combined.

In a third aspect, the invention includes an apparatus comprising:

(a) a solvent recovery apparatus for separating a diluted tailings component derived from bitumen froth into a recovered solvent component and a solvent recovered tailings component;

(b) a discharge outlet for discharging the solvent recovered tailings component from the solvent recovery apparatus as a discharged solvent recovered tailings component; and (c) a return line for returning a portion of the discharged solvent recovered tailings component to the solvent recovery apparatus as a returned solvent recovered tailings component.

It will be understood that the units used in treating solvent-containing fluid will normally be sealed.

In a fourth aspect, the invention includes an apparatus comprising:

(a) a solvent recovery apparatus for separating a diluted tailings component recovered from the bitumen froth into a recovered solvent component and a solvent recovered tailings component;

(b) a discharge outlet for discharging the solvent recovered tailings component from the solvent recovery apparatus as a discharged solvent recovered tailings component; and (c) a thickener vessel associated with the solvent recovery apparatus for thickening at least a portion of the discharged solvent recovered tailings component to produce a thickener underflow component and a thickener overflow component.

In a fifth aspect, the invention includes a process for treating tailings to recover therefrom a clarified overflow component, an unclarified overflow component and an underflow component, comprising the following steps:

(a) introducing the tailings into a thickener vessel;

(b) withdrawing an underflow component from a lower level of the thickener vessel;

(c) withdrawing a clarified overflow component from an intermediate level of the thickener vessel; and (d) withdrawing an unclarified overflow component from an upper level of the thickener vessel.

In a sixth aspect, the invention includes a thickener vessel comprising:

(a) a sidewall defining a lower level of the thickener vessel, an intermediate level of the thickener vessel and an upper level of the thickener vessel;

(b) a feedwell for introducing tailings into the thickener vessel;

(c) at least—one underflow outlet in communication with the lower level of the thickener vessel for withdrawing an underflow component from the thickener vessel;

(d) at least one clarified overflow outlet in communication with the intermediate level of the thickener vessel for withdrawing a clarified overflow component from the thickener vessel; and (e) at least one unclarified overflow outlet in communication with the upper level of the thickener vessel for withdrawing an unclarified overflow component from the thickener vessel.

The thickener vessel of the third and fourth aspects may be comprised of any suitable receptacle which is capable of receiving tailings and of implementing the tailings treatment process of the invention. For example, the thickener vessel may be above ground or below ground and may have any shape or size. The thickener vessel may be uncovered, covered or sealed. In the preferred embodiment the thickener vessel is generally sealed and cylindrical in plan view.

The thickener vessel includes a sidewall. The sidewall defines the height of the thickener vessel and defines the levels of the thickener vessel. The sidewall may be constructed of any suitable material and may have any suitable shape. For example, if the thickener vessel is to be sealed and is likely to contain volatile materials, the sidewall and other components of the thickener vessel may be designed as a pressure vessel. In other applications, the thickener vessel may be below ground and may be comprised of a lined or unlined pit or trench.

In the preferred embodiment the thickener vessel is constructed of metal, preferably steel, and has a continuous sidewall. In the preferred embodiment, the sidewall is substantially vertical throughout the upper level and the intermediate level and is sloped throughout at least a portion of the lower level, thus providing a sloping cone-shaped bottom. The cone shaped bottom assists in the collection and removal at the underflow outlet of the underflow component of the tailings. In the preferred embodiment, the sidewall further defines a sump at a central location within the lower level of the thickener vessel for collecting the underflow component.

The purpose of the process of the third aspect and the thickener vessel of the fourth aspect is to recover from the tailings a clarified overflow component, an unclarified overflow component and an underflow component. The objective in separating the overflow component into a clarified overflow component and an unclarified overflow component is to provide the clarified overflow component which can be recycled without further processing and which will not risk fouling of heat exchangers and other apparatus due to the presence of significant amounts of solids and/or other impurities.

As a result, preferably the process is performed and the thickener vessel is configured to enhance the separation of the tailings into these three components and to maximize the efficiency of the overall tailings treatment process.

One desirable mechanism for achieving the purpose of the third aspect and the fourth aspect is effectively configuring the location or locations at which tailings are introduced to the thickener vessel and the locations at which overflow and underflow components are removed from the thickener vessel. A second important mechanism for achieving the purpose is configuring the thickener vessel overall so that the tailings are provided with an opportunity to separate into the three output streams and so that the three output streams are directed towards the appropriate outlets.

The tailings are comprised of solids or other impurities which are suspended or dispersed in a liquid medium. The tailings treatment process and the thickener vessel are designed to exploit differences in the densities and other properties of the solids, other impurities and the liquid medium.

The tailings may be obtained from any chemical or mechanical process in which tailings are generated and in which the generated tailings are capable of being separated into an underflow component, an unclarified overflow component and a clarified overflow component.

In the preferred embodiment, the tailings are derived from either the bitumen froth stream or the middlings stream resulting from an oil sand extraction process. The liquid medium is therefore typically water, the solids typically comprise fine solids such as clay or silt, and the other impurities typically include bitumen and other hydrocarbons such as diluent solvents.

In the preferred embodiment the underflow component is comprised of a thickened suspension of solids and/or other impurities which are more dense than the liquid medium. The unclarified overflow component is comprised of solids and/or other impurities which are less dense than the liquid medium. The clarified overflow component consists essentially of the liquid medium, but may also include a small amount of solids and/or other impurities.

The tailings treatment process and the thickener vessel are therefore designed so that the underflow and overflow components are withdrawn from the thickener vessel at different levels which reflect the densities of the constituents of the underflow and overflow components.

The tailings are introduced into the thickener vessel at a feedwell and the underflow and overflow components are withdrawn from the thickener vessel at their respective outlets. The feedwell may be positioned at any suitable location in the thickener vessel. The underflow outlet may be positioned at any suitable location within the lower level of the thickener vessel. The clarified overflow outlet may be positioned at any suitable location within the intermediate level of the thickener vessel. The unclarified overflow outlet may be positioned at any suitable location within the upper level of the thickener vessel.

Preferably the feedwell is positioned in spaced relation relative to the sidewall, preferably the underflow component outlet is positioned adjacent to the lower end of the thickener vessel, preferably the clarified overflow outlet is positioned at a location adjacent to the sidewall, and preferably the unclarified overflow outlet is positioned at a location adjacent to the sidewall.

In a preferred embodiment the sidewall defines a thickener area and the feedwell is positioned in spaced relation relative to the sidewall and in a central location within the thickener area. In a preferred embodiment the feedwell extends within the thickener vessel so that the tailings are introduced into the thickener vessel at the intermediate level of the thickener vessel.

Preferably the tailings are distributed within the thickener vessel after they are introduced into the thickener vessel. Preferably the thickener vessel comprises a distributor apparatus and the tailings are distributed by contacting the distributor apparatus as they enter the thickener vessel. In a preferred embodiment the distributor apparatus is comprised of a cone shaped distributor plate which deflects the tailings outwardly and downwardly as they enter the thickener vessel.

The thickener vessel may further comprise a launder for collecting the unclarified overflow component before it is withdrawn from the thickener vessel. The launder may comprise a trough adjacent to and extending along all or a portion of the sidewall of the thickener vessel and may further comprise a weir over which the unclarified overflow component must pass in order to enter the launder. Where the thickener vessel includes a launder, the unclarified overflow—outlet communicates with the launder to withdraw the unclarified overflow component from the thickener vessel.

The thickener vessel may comprise one or a plurality of feedwells, underflow outlets, clarified overflow outlets and unclarified overflow outlets. In a preferred embodiment, the thickener vessel comprises a single feedwell, a single underflow outlet, a plurality of clarified overflow outlets, and a single unclarified overflow outlet which communicates with a launder. Preferably the plurality of clarified overflow outlets comprises four clarified overflow outlets distributed and spaced circumferentially about the sidewall.

The tailings treatment process may include the step of adding a flocculent to the tailings to enhance the settling of the underflow component. The flocculent may be added to the tailings in the thickener vessel or it may be added to the tailings before they enter the thickener vessel.

The tailings treatment process may further comprise the step of passing a gas upwards through the tailings in the thickener vessel in order to enhance the clarification of the clarified overflow component, and the thickener vessel may be further comprised of a sparge apparatus for delivering the gas. Preferably the gas is air but other gases, including inert gases, may be used.

The gas is preferably passed upwards through the tailings at a position which is between the feedwell and the clarified overflow outlets so that the gas provides a curtain of bubbles through which the clarified overflow component may pass before being withdrawn from the thickener vessel. The sparge apparatus is therefore preferably located between the clarified overflow outlets and the feedwell.

The thickener vessel may further comprise a baffle arrangement for stilling the clarified overflow component before it is withdrawn from the thickener vessel. The baffle arrangement may also provide a sinuous path for the clarified overflow component to assist in the removal of solids and/or other impurities from the clarified overflow component before it is withdrawn from the thickener vessel.

Preferably a baffle arrangement substantially or completely surrounds each of the clarified overflow outlets. A baffle arrangement may extend upward or downward within the thickener vessel. Preferably a baffle arrangement does not interfere significantly with the path of the clarified overflow component as it moves through the curtain of bubbles and toward a clarified overflow outlet.

In a preferred embodiment, a baffle arrangement substantially or completely surrounds each of the clarified overflow outlets and each baffle arrangement extends downward a short distance from above the clarified overflow outlet so that it terminates at a point above the clarified overflow outlet.

Preferably the sparge apparatus and the baffle arrangement are configured so that the baffle arrangement is located within the thickener vessel between the sparge apparatus and the clarified overflow outlet.

In a preferred embodiment a sparge apparatus is associated with each baffle arrangement such that the sparge apparatus is suspended from a lower end of the baffle arrangement. The sparge apparatus may be suspended from the lower end of the baffle arrangement in any suitable manner. In a preferred embodiment the sparge apparatus is suspended from the lower end of the baffle arrangement with sparge apparatus hangers which are spaced and configured so that they do not interfere significantly with the movement of the clarified overflow component toward the clarified overflow outlet.

In one preferred embodiment, a process is provided for treating a diluted tailings component comprising heated water, particulate mineral solids and residual bitumen and solvent. The diluted tailings component has been derived from bitumen froth by dilution and mixing of the bitumen froth with solvent and separation of the resulting diluted bitumen froth into a diluted bitumen component and said diluted tailings component. The process comprises:

subjecting the diluted tailings component to a solvent recovery separation to separately produce a recovered solvent component and a solvent recovered tailings component containing water and solids and some residual bitumen and solvent; and subjecting the solvent recovered tailings to gravity separation to separately produce an overflow stream mainly comprising clarified heated water and an underflow stream mainly comprising solids and water.

Optionally, at least part of the clarified heated water is recycled for re-use in the process.

Optionally, the solvent recovered tailings component may be subjected to a combination of gravity separation and gas flotation to produce the overflow and underflow streams and a third stream comprising residual bitumen and residual solvent.

In another preferred embodiment, sealed apparatus, for treating solvent diluted tailings component derived from bitumen froth, is provided. The apparatus comprises:

first means for recovering solvent from the solvent diluted tailings component and separately producing a recovered solvent component and a solvent recovered tailings component containing water and solids and residual bitumen and solvent; and second means for subjecting the solvent recovered tailings component to gravity separation to separately produce an overflow stream mainly comprising clarified heated water and an underflow stream mainly comprising solids and water.

Optionally the apparatus comprises third means for recycling clarified heated water from the second means to the first means.

Preferably the first means comprises first and second solvent recovery separators connected in series, each separator having overhead means for removing a recovered solvent component and underflow means for removing a solvent recovered tailings component; the underflow means of the first separator having means for pumping part of the solvent recovered tailings component, issuing from the first separator, back into the first separator and means for pumping the remainder of the solvent recovered tailings component into the second separator.

BRIEF DESCRIPTION OF THE DRAWINGS

Embodiments of the invention will now be described with reference to the accompanying drawings, in which.

DETAILED DESCRIPTION

The present invention relates to processes and apparatus for the treatment of product streams from mineral processing operations. The present invention is particularly suited to the treatment of tailings from such processes and is even more particularly suited to the treatment of tailings which comprise relatively fine solids and other impurities.

In preferred embodiments of the invention, the invention relates to the treatment of tailings obtained from oil sand processing operations and in particular, to the treatment of tailings which are obtained from bitumen froth (which may comprise either the bitumen froth stream or the middlings stream or both) produced from a process for recovering bitumen from oil sand. In the preferred embodiments, the tailings are obtained from oil sand extraction processes such as the Clark Process or other comparable processes.

Figure 1:
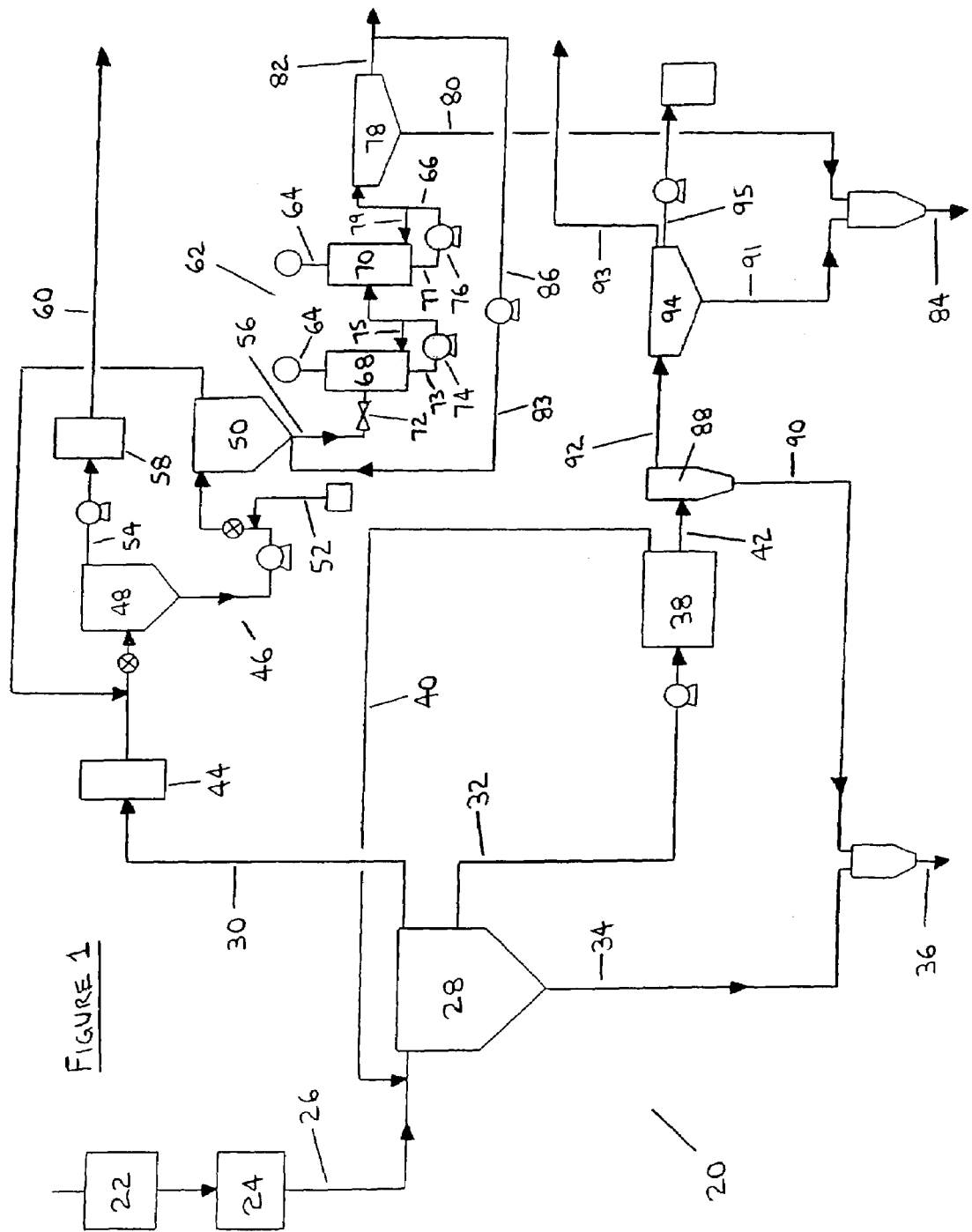
FIG. 1 is a schematic flow diagram of preferred embodiments of processes of the present invention implemented in conjunction with an oil sand extraction process.
Figure 2:
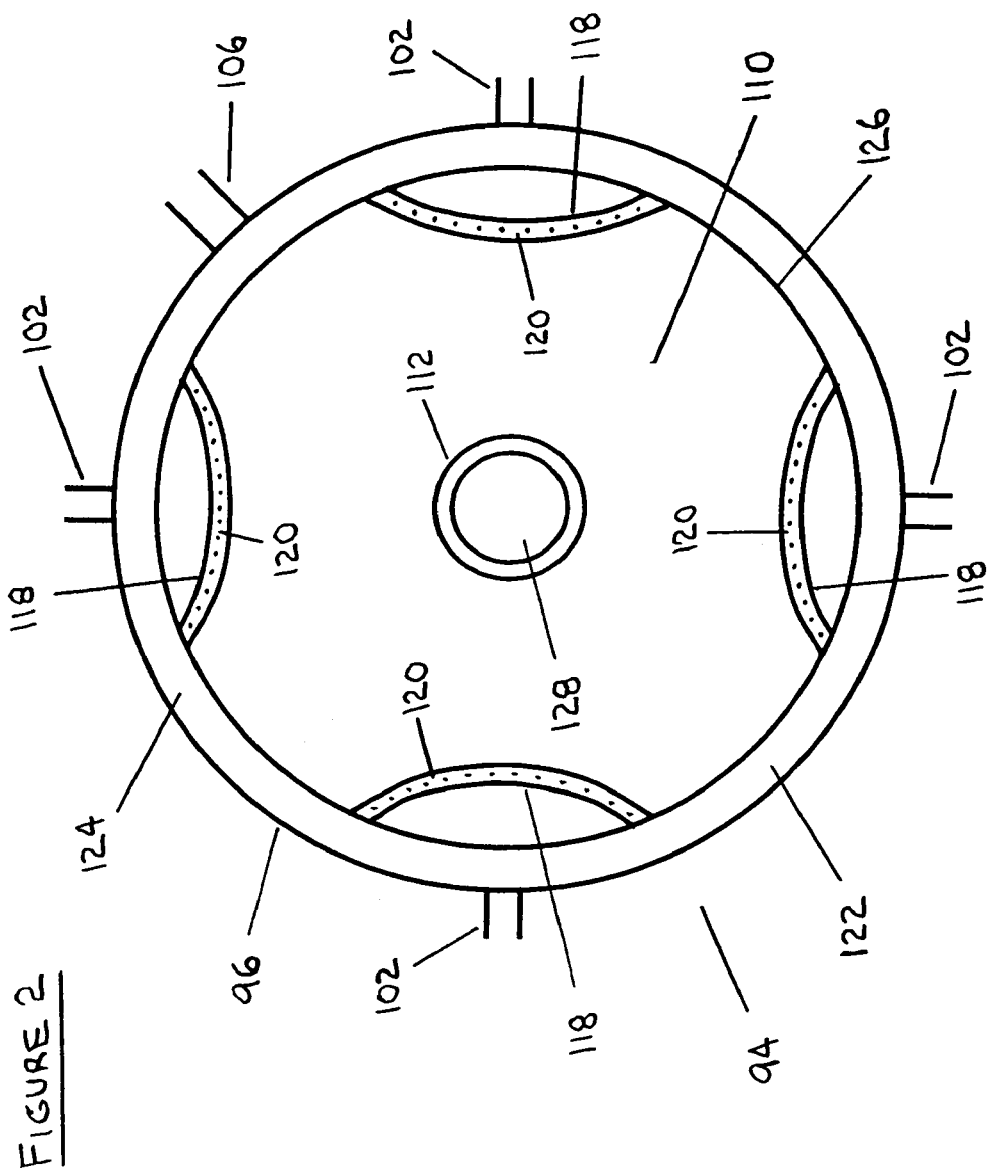
FIG. 2 is a plan view of a thickener vessel in accordance with a preferred embodiment of the invention.
Figure 3:
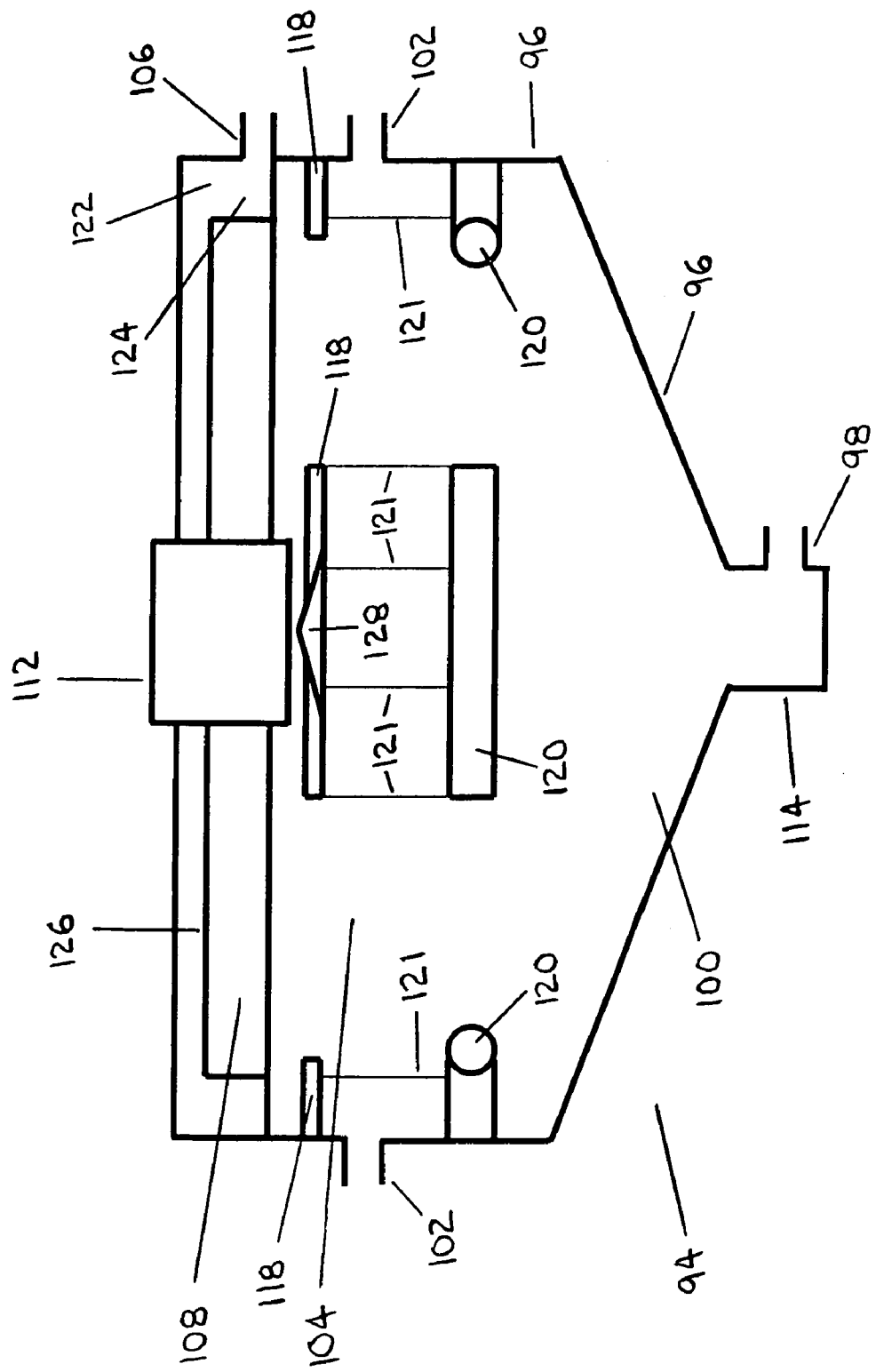
FIG. 3 is a transverse cross section view of the thickener vessel of FIG. 2 taken along line 33.
Figure 4:
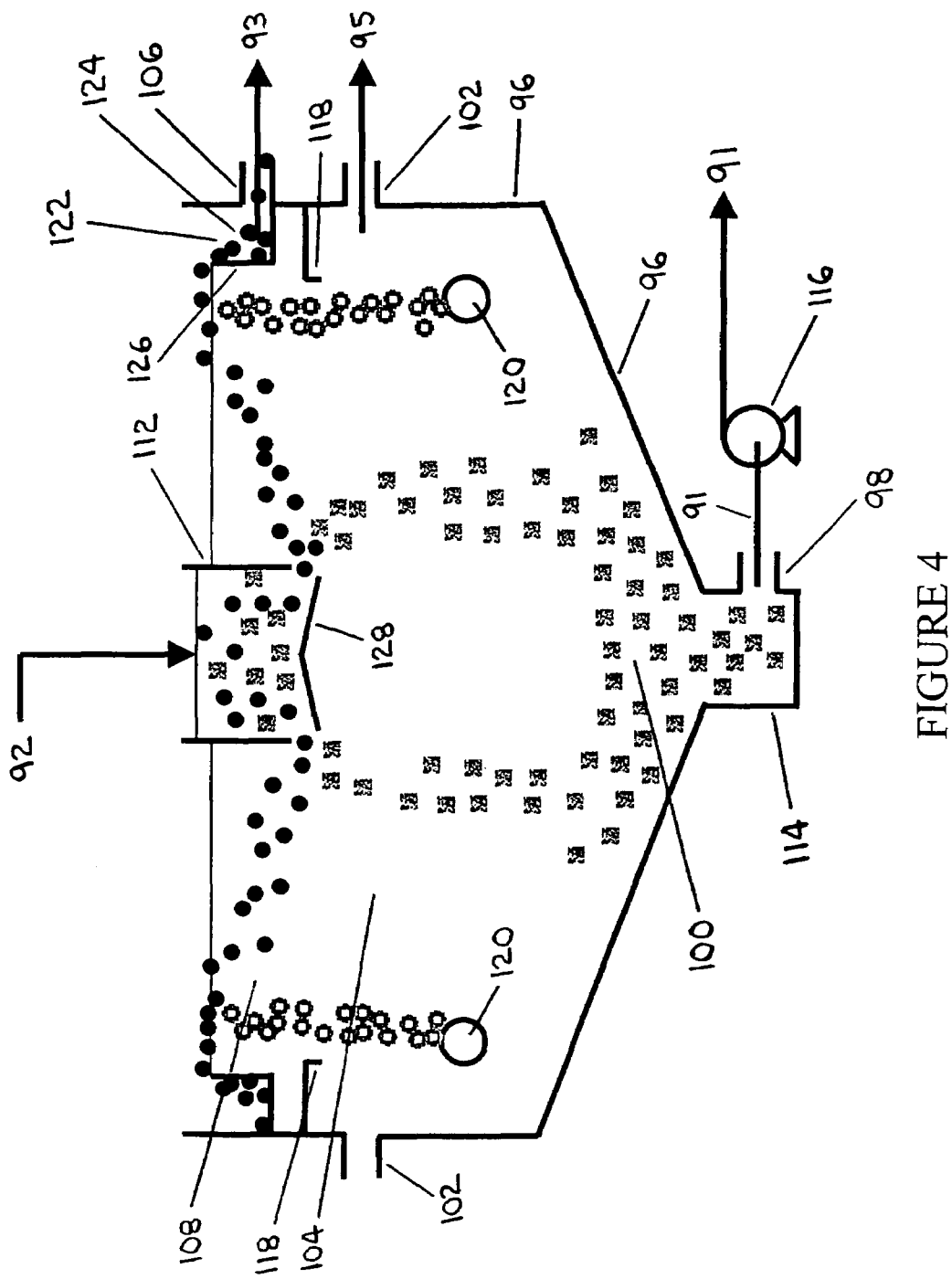
FIG. 4 is a schematic diagram of the thickener vessel of FIGS. 2 and 3, depicting the introduction of tailings into the thickener vessel and the withdrawal from the thickener vessel of an undertow component, a clarified overflow component and an unclarified overflow component.

Preferred embodiments of the present invention are outlined in the flow diagram of FIG. 1, depicting processes of the present invention implemented in conjunction with the Clark Process or a comparable oil sand extraction process and FIGS. 2-4, which depict a thickener vessel according to a preferred embodiment of the invention.

Referring to FIG. 1, an exemplary oil sand extraction process (20) includes a number of steps. The first step is a mining step (not shown) in which oil sand is removed from an oil sand deposit. The second step is a crushing step (22) in which the mined oil sand is crushed into lumps of a desired size.

The third step is a conditioning step (24) in which the oil sand is mixed with water to form a slurry. Conditioning agents may also be added to the oil sand as part of the conditioning step. For example in the Clark Process, sodium hydroxide (caustic) is typically added to the oil sand slurry during the conditioning step (24) in order to maintain the slurry at a slightly basic pH.

Following the conditioning step (24) a transportation step (26) transports the oil sand slurry to a primary separation vessel (PSV) (28). The transportation step (26) is typically performed by transporting the oil sand slurry in a pipeline.

The oil sand is also typically heated as part of the conditioning step (24) or the transportation step (26) in order to raise the temperature of the oil sand to the oil sand extraction process (20) operating temperature.

In the PSV (28), a primary recovery step occurs in which the oil sand slurry is separated into three different product streams. The first product stream is a bitumen froth stream (30). The second product stream is a middlings stream (32). The third product stream is a coarse tailings stream (34).

The coarse tailings stream (34) typically consists of relatively coarse particles of solid material which is present either as sand, gravel or non-dispersed fine solid material such as clay and/or silt. The coarse tailings stream (34) may typically be disposed of without further processing in a coarse tailings disposal step (36). The coarse tailings in the coarse tailings stream (34) maybe used, for example, to construct berms or dykes (not shown) as part of a fine tailings containment facility.

The bitumen froth stream (30) typically includes bitumen, asphaltenes, dispersed fine solid material such as clay and/or silt and water. The bitumen froth stream (30) is typically further processed following the oil sand extraction process (20) to remove water, asphaltenes and fine solid material and thus purify the bitumen as a preliminary step towards upgrading of the bitumen to a synthetic crude oil.

As will be described in detail in the description that follows, the processing of the bitumen froth stream (30) typically results in the separation of the bitumen froth stream (30) into a bitumen froth component and a tailings component. This tailings component may be characterized as "fine tailings" comprising dispersed fine solid material. The present invention is directed in part at the treatment, following the oil sand extraction process (20), of the tailings component which is obtained from processing of the bitumen froth stream (30).

The middlings stream (32) typically includes fine solid material such as clay and/or silt, water, and a relatively small amount of bitumen and asphaltenes. The middlings stream (32) is typically further processed as part of the oil sand extraction process (20) in a secondary recovery step to recover additional bitumen from the middlings stream (32). This secondary recovery step is typically performed by passing the middlings stream (32) through a series of flotation cells (38).

The secondary recovery step typically results in the separation of the middlings stream (32) into a secondary bitumen froth stream (40) and middlings tailings (42). The secondary bitumen froth stream (40) is typically recycled to be combined with conditioned oil sand slurry and is thus reintroduced to the PSV (28).

The middlings tailings (42) may be characterized as "fine tailings" comprising dispersed fine solid material. The present invention is directed in part at the treatment of the middlings tailings (42) which result from the secondary recovery step in the oil sand extraction process (20).

The invention therefore relates generally to the treatment of fine tailings and is particularly suited to the treatment of fine tailings obtained from an oil sand extraction process (20) or a related process. In the description that follows, the invention will be described in the context of the treatment of a tailings component resulting from further processing of the bitumen froth stream (30) and in the context of the treatment of middlings tailings (42) resulting from secondary recovery of bitumen from the middlings stream (32).

Referring to FIG. 1, the bitumen froth stream (30) exits the PSY (28) and is transferred to a deaerator apparatus (44) in which entrained air in the bitumen froth stream (32) is removed.

From the deaerator apparatus (44) the bitumen froth stream (30) enters a separator apparatus (46). The separator apparatus (46) may be comprised of one or a plurality of separator units which may be configured in series or in parallel. The separator units may be comprised of separator vessels, plate separators or other separator equipment.

In the preferred embodiment the separator apparatus (46) is comprised of a first separator unit (48) and a second separator unit (50) configured in series, both of which separator units (48,50) are separator vessels. The separator apparatus (46) may, however, be comprised of more or fewer than two separator units.

The separator apparatus (46) is configured to perform a separating step. In the preferred embodiment the separating step includes a first separating step performed in the first separator unit (48) and a second separating step performed in the second separator unit (50). The separating step utilizes a diluent solvent (52) which is added to the bitumen froth stream (30) to dilute the bitumen froth stream (30) and thus enhance the performance of the separating step.

The purpose of the separating step is to separate the bitumen froth stream (30) into a diluted bitumen component (54) and a diluted tailings component (56).

The diluted bitumen component (54) may be discharged from the separator apparatus (46) at both the first separator unit (48) and the second separator unit (50). In the preferred embodiment, however, the separator apparatus (46) is configured to operate in a "countercurrent" manner. In other words, the diluted bitumen component (54) is preferably discharged from the separator apparatus (46) only at the first separator unit (48) and the diluted tailings component (56) is preferably discharged from the separator apparatus (46) only at the second separator unit (50).

This result is achieved by recycling back to the first separator unit (48) the diluted bitumen component which is discharged from the second separator unit (50) so that the diluted bitumen component (54) is only discharged from the separator apparatus (46) at the first separator unit (48). Conversely, the diluted tailings component which is discharged from the first separator unit (48) passes through to the second separator unit (50) so that the diluted tailings component (56) is only discharged from the separator apparatus (46) at the second separator unit (50).

The diluent solvent (52) is preferably added to the second separator unit (50) so that the diluent solvent (52) is added to the first separator unit (48) only indirectly by recycling back to the first separator unit (48) the diluted bitumen component which is discharged from the second separator unit (50).

Adding the diluent solvent (52) to the second separator unit (50) provides several advantages. First, the loading of diluent solvent (52) in the bitumen froth stream (30) will be higher in the second separator unit (50) than in the first separator unit (48). This results in a more diluted bitumen froth stream (30) in the second separator unit (50), which may assist in recovering bitumen which was not recoverable in the first separator unit (48).

Second, since the separator apparatus (46) is preferably configured to operate in a countercurrent maimer, adding the diluent solvent (52) to the second separator unit (50) provides an opportunity to regulate the operating temperatures of both the first separating step and the second separating step by controlling the temperature and loading of the diluent solvent (52) which is added to the second separator unit (50). In the preferred embodiment, the diluent solvent (52) is heated to a suitable temperature to ensure that the operating temperatures in the first separator unit (48) and the second separator unit (50) are compatible with the properties of the bitumen froth stream (30) and the selected diluent solvent (52).

Third, the addition of the diluent solvent (52) only to the second separator unit (50) permits optimization of the amount of diluent solvent (52) which is used in the separating step, since the maximum loading of diluent solvent (52) is provided in the second separating step where it is most needed.

The performance of the separating step is dependent to some extent upon the properties of the diluent solvent (52) which is used in the separating step. It is known in the art to use either naphtha (aromatic) solvents or paraffinic (saturated aliphatic) solvents as the diluent solvent in the treatment of bitumen froth. Other organic and inorganic solvents may also potentially be used as the diluent solvent (52).

Some of the advantages of paraffinic solvents in comparison with naphtha solvents are discussed in Canadian Patent No. 2,149,737 (Tipman et al).

The required operating temperature of the separating step and the amount of diluent solvent (52) required for the separating step will be somewhat dependent upon the choice of diluent solvent (52). Naphtha solvents tend to have larger, more complex molecules than paraffinic solvents and thus tend to require a higher operating temperature for the separating step and larger amounts of solvent than do paraffinic solvents. Similarly, heavier, longer chain paraffinic solvents tend to require a higher operating temperature for the separating step and larger amounts of solvent than do lighter, shorter chain paraffinic solvents. The energy requirements and diluent solvent (52) requirements of the separating step may therefore typically be reduced by selecting a paraffinic solvent over a naphtha solvent and by selecting a relatively lighter paraffinic solvent over a relatively heavier paraffinic solvent.

Consideration should, however, be given in the selection of the diluent solvent (52) to the propensity of a particular solvent to cause precipitation of asphaltenes from the bitumen froth stream (30). Since asphaltenes are essentially hydrocarbons, their precipitation during the separating step should be managed to minimize loss of hydrocarbons from the diluted bitumen component and to minimize the amount of asphaltenes which are contained in the diluted tailings component (56). Excessive precipitation of asphaltenes during the separating step may also result in excessive formation of an asphaltene "rag layer" in the separator apparatus (46), which rag layer may interfere with the efficient performance of the separating step.

Asphaltenes tend to exhibit greater solubility in longer chain paraffinic solvents than in shorter chain paraffinic solvents, with the result that the amount of asphaltenes precipitated decreases as the selected paraffinic solvent becomes heavier or longer chained. Asphaltene precipitation is therefore generally greater in pentane than it is in hexane, heptane or octane.

The precipitation of asphaltenes from the bitumen froth stream (30) is also dependent upon the selection of the operating temperature for the separating step. The amount of asphaltenes precipitated from a particular solvent will generally decrease as the operating temperature is increased.

Finally, the precipitation of asphaltenes from the bitumen froth stream is also dependent upon the amount of diluent solvent (52) which is added to the bitumen froth stream (30). The amount of asphaltenes precipitated from a particular solvent will generally increase as the amount of the solvent increases.

As a result of these considerations, the type of diluent solvent (52), the amount of diluent solvent (52) and the operating temperature of the separating step should all be selected with the goal of minimizing the cost and maximizing the efficiency of the separating step.

In a preferred embodiment, the diluent solvent (52) is preferably a paraffinic solvent and is preferably a paraffinic solvent having an overall carbon chain length of between $C_5$ and $C_8$. Depending upon the specific paraffinic solvent selected, the operating temperature required for the separating step may vary between about 60 degrees Celsius and about 130 degrees Celsius.

In this embodiment, the operating temperature of the separating step is controlled by directly controlling the temperature in the second separator unit (50) and thus the temperature during the second separating step. As a result, preferably the first separating step is performed at a temperature which is lower than the temperature at which the second separating step is performed.

In this embodiment, the operating temperature of the second separating step is controlled by providing a heat input to the second separating step. Due to the recycling back to the first separator unit (48) of the diluted bitumen component from the second separator unit (50), the operating temperature of the first separating step is indirectly controlled. In the preferred embodiment the heat input is provided to the second separating step by heating the diluent solvent (52) before it is added to the second separator unit (50).

By way of example, where the diluent solvent (52) is pentane, the second separating step may be performed at a temperature of about 90 degrees Celsius while the first separating step may be performed at a temperature of about 70 degrees Celsius.

Following completion of the separating step, the diluted bitumen component (54) is passed through a bitumen solvent recovery apparatus (58) in order to recover diluent solvent (52) from the diluted bitumen component (54) and produce a solvent recovered bitumen component (60).

The bitumen solvent recovery apparatus (58) may be comprised of any suitable apparatus such as, for example, a subatmospheric vessel with an associated condenser for separating the diluent solvent (52) from the diluted bitumen component (54) and recovering the diluent solvent (52). The bitumen solvent recovery apparatus (58) may be comprised of one or a plurality of bitumen solvent recovery units configured in series or in parallel. The diluent solvent (52) recovered in the bitumen solvent recovery apparatus (58) may be re-used in the separating step and the solvent recovered bitumen component (60) may be stored or transported for upgrading.

Following completion of the separating step, the diluted tailings component (56) is passed through a tailings solvent recovery apparatus (62) for a solvent recovering step in which the diluted tailings component (56) is separated into a recovered solvent component (64) and a solvent recovered tailings component (66).

The tailings solvent recovery apparatus (62) may be comprised of any suitable apparatus and may be similar to the bitumen solvent recovery apparatus (58). The tailings solvent recovery apparatus (62) may be comprised of one or more tailings solvent recovery units configured in series or in parallel. In the embodiment shown in FIG. 1, the tailings solvent recovery apparatus (62) is comprised of at least two tailings solvent recovery units configured in series.

Referring to FIG. 1, the tailings solvent recovery apparatus (62) includes a first tailings solvent recovery unit (68) and a second tailings solvent recovery unit (70).

The diluted tailings component (56) is transferred from the second separator unit (50) through a pressure moderating apparatus (72) such as a valve, regulator or other suitable device to moderate the pressure of the diluted tailings component (56), in order first to minimize the formation of slug flow through the transfer line, second to minimize transfer line erosion, and third to assist in the breakdown of foam which may be created during the separating step. This moderation of pressure may not be necessary if the separating step has been performed at an operating temperature which does not require significant pressurization of the bitumen froth stream (30).

From the pressure moderating apparatus (72) the diluted tailings component (56) is transferred to the first tailings solvent recovery unit (68) to obtain an amount of the recovered solvent component (64). The solvent recovered tailings component discharged from the first tailings solvent recovery unit (68) exits via a first discharge outlet (73) and is passed through a first recycle pump (74) to expose the solvent recovered tailings component to shearing conditions in order to break up asphaltene flocs and encourage further liberation of solvent from the solvent recovered tailings component.

From the first recycle pump (74) a portion of the solvent recovered tailings component discharged from the first tailings solvent recovery unit (68) is returned via a first return line (75) to the first tailings solvent recovery unit (68) in order to increase the downward flux in the first tailings solvent recovery unit (68), inhibit the formation of an asphaltene mat or rag layer in the bottom of the first tailings solvent recovery unit (68), and suppress the formation of foam.

The non-returned portion of the solvent recovered tailings component discharged from the first tailings solvent recovery unit (68) is transferred to the second tailings solvent recovery unit (70) to recover a further amount of the recovered solvent component (64).

Optionally, the solvent recovered tailings component discharged from the second tailings solvent recovery unit (70) is passed via a second discharge outlet (77) through a second recycle pump (76) in order to expose the solvent recovered tailings component to shearing conditions and thus break up asphaltene flocs and encourage further liberation of solvent from the solvent recovered tailings component.

From the second recycle pump (76) a portion of the solvent recovered tailings component discharged from the second tailings solvent recovery unit (70) is optionally returned via a second return line (79) to the second tailings solvent recovery unit (70) in order to increase the downward flux in the second tailings solvent recovery unit (70), inhibit the formation of an asphaltene mat or rag layer in the bottom of the second tailings solvent recovery unit (70), and suppress the formation of foam.

The non-returned portion of the diluted tailings component discharged from the second tailings solvent recovery unit (70) constitutes the solvent recovered tailings component (66) and is transferred to a first thickener vessel (78) for thickening.

The second recycle pump (76) and the return of a portion of the solvent recovered tailings component which is discharged from the second tailings solvent recovery unit (70) may be optional, since the formation of an asphaltene mat and the formation of foam has been observed to be more prevalent in the first tailings solvent recovery unit (68) than in the second tailings solvent recovery unit (70).

In the first thickener vessel (78) the solvent recovered tailings component (66) is subjected to gravity separation to produce a thickener underflow component (80) and a thickener overflow component (82). The thickener underflow component (80) may be disposed of in a fine tailings disposal step (84), which may involve depositing the thickener underflow component in a tailings pond (not shown) or similar facility.

In the preferred embodiment, a portion of the thickener overflow component (82), comprising clarified heated water, is returned to the separator apparatus (46) via a thickener return line (83) as a returned thickener overflow component (86). In particular, the returned thickener overflow component (86) is preferably transferred to the second separator unit (SO) to dilute the diluted tailings component (56) to minimize plugging of the transfer line to the tailings solvent recovery apparatus (62) by asphaltene slugs and to conserve heat energy contained in the returned thickener overflow component (86). Preferably the returned thickener overflow component (86) is at a temperature close to the operating temperature of the tailings solvent recovery apparatus (62) to avoid quenching of the diluted tailings component (56) and resulting interference with the operation of the tailings solvent recovery apparatus (62).

The non-returned portion of the thickener overflow component (82) may optionally be transferred to clarifying apparatus (not shown) to prepare the thickener overflow component (82) for recycling.

Referring to FIG. 1, in the preferred embodiment the middlings tailings (42) obtained from the middlings stream (32) are transferred from the flotation cells (38) to one or more hydrocyclones (88) or other separation apparatus in order to separate the middlings tailings (42) into a solid material stream (90) and a fine tailings stream (92). The solid material stream (90) typically comprises relatively coarse particles of solid material and may typically be disposed of without further processing in similar manner as the coarse tailings stream (34) either as part of the coarse tailings disposal step (36) or in a separate step.

The fine tailings stream (92) from the hydrocyclones (88) is transferred to a second thickener vessel (94). The fine tailings stream (92) typically comprises relatively fine particles of solid material, other impurities such as asphaltenes and a small amount of bitumen dispersed in a relatively large proportion of water. The objective in treating the fine tailings stream (92) in the second thickener vessel (94) is first, to concentrate the solid material and other impurities and second, to clarify and recover as much water as possible for possible recycling.

In a conventional thickener vessel, tailings are separated into an underflow component and an overflow component. In the conventional processing of oil sand, the overflow component will invariably contain small amounts of bitumen, which can foul heat exchanger equipment if the overflow component is directly recycled for reheating and re-use. As a result, steps must typically be taken to clarify further the overflow component from a conventional thickener vessel before the overflow component can be recycled.

In the preferred embodiment of the present invention the design of the second thickener vessel (94) facilitates the recovery of an underflow component (91), an unclarified overflow component (93), and a clarified overflow component (95) which preferably is sufficiently clean that it can be recycled back to the oil sand extraction process (20) or related processes without further treatment or clarification.

Referring to FIGS. 2-4, a preferred embodiment of the second thickener vessel (94) is depicted. The second thickener vessel (94) includes a sidewall (96) which extends from the lowest elevation of the second thickener vessel (94) to the highest elevation of the second thickener vessel (94). The sidewall (96) therefore defines the height of the second thickener vessel (94) and defines several different levels of the second thickener vessel (94).

At least one underflow outlet (98) communicates with a lower level (100) of the second thickener vessel (94). At least one, but preferably a plurality of clarified overflow outlets (102) communicate with an intermediate level (104) of the second thickener vessel (94). At least one unclarified overflow outlet (106) communicates with an upper level (108) of the second thickener vessel (94).

Referring to FIG. 2, the sidewall (96) also defines a thickener area (110). In the preferred embodiment the thickener area (110) is generally circular but the thickener area (110) may be square, rectangular or any other suitable shape.

Referring to FIG. 2, a feedwell (112) is located generally centrally within the thickener area (110). The feedwell (112) comprises a relatively large inlet conduit which extends downward into the intermediate level (104) of the second thickener vessel (94).

The underflow outlet (98) is preferably located within a sump (114) which is near to the lowest elevation of the second thickener vessel (94) and is preferably located generally centrally within the thickener area (110). The sidewall (96) is preferably sloped downwards towards the sump (114) and the underflow outlet (98) throughout at least a portion of the lower level (100) of the second thickener vessel (94). The underflow outlet (98) is associated with a pump (116) for pumping the underflow component (91) from the underflow outlet (98).

The clarified overflow outlets (102) are preferably located adjacent to the sidewall (96). In the preferred embodiment, four clarified overflow outlets (102) are spaced circumferentially around the sidewall (96).

Associated with each of the clarified overflow outlets (102) is a baffle arrangement (118) for stilling the clarified overflow component (95) before it reaches the clarified overflow outlet (102) and for providing a sinuous path for the clarified overflow component (95) to further facilitate the clarification of the clarified overflow component (95).

In the preferred embodiment each baffle arrangement (118) is comprised of a baffle plate which surrounds the clarified overflow outlet (102). The baffle plate extends downward from above the clarified overflow outlet (102) and terminates above the clarified overflow outlet (102) to permit the clarified overflow component (95) to access the clarified overflow outlet (102) without significant interference from the baffle plate.

A sparge apparatus (120) is provided within the second thickener vessel (94) for passing a gas upwards through the fine tailings stream (92). The sparge apparatus (120) is comprised of a perforated pipe through which a gas such as air can be passed to provide a curtain of gas bubbles The sparge apparatus (120) is located at an elevation below the clarified overflow outlets (102) and between the feedwell (112) and the clarified overflow outlets (102) so that the clarified overflow component (95) may pass through a curtain of gas bubbles before reaching one of the clarified overflow outlets (102).

The sparge apparatus (120) may be comprised of a single continuous length of perforated pipe or may be comprised of a plurality of segments of perforated pipe. The sparge apparatus (120) may be distributed throughout the entire second thickener vessel (94), may be provided as a "ring" or "rings" within the second thickener vessel (94) or may be localized adjacent to the clarified overflow outlets (102).

In the preferred embodiment the sparge apparatus (120) is associated with the baffle arrangements (118). More particularly, in the preferred embodiment a separate segment of the sparge apparatus (120) is suspended from each of the baffle arrangements (118) with a plurality of sparge apparatus hangers (121). The sparge apparatus hangers (121) are configured so that they do not interfere significantly with the movement of the clarified overflow component (95) toward the clarified overflow outlets (102).

The unclarified overflow outlet (106) is preferably located adjacent to the sidewall of the second thickener vessel (94). In the preferred embodiment, the unclarified overflow outlet (106) is associated with a launder (122) located at the upper level (108) of the second thickener vessel (94) so that the unclarified overflow component (93) is first collected in the launder (122) and then withdrawn from the second thickener vessel (94) by the unclarified overflow outlet (106).

In the preferred embodiment the launder (122) is comprised of a trough (124) which extends along the entire length of the sidewall (96) adjacent to the highest elevation of the second thickener vessel (94), and is further comprised of a weir (126) over which the unclarified overflow component (93) must pass in order to enter the launder (122).

The fine tailings stream (92) from the hydrocyclones (88) enters the second thickener vessel (94) via the feedwell (112) and the separated components (91,93,95) are withdrawn from the second thickener vessel (94) at the outlets (98,106,102) respectively. To assist in dispersing the fine tailings stream (92) throughout the second thickener vessel (94), the second thickener vessel (94) preferably includes a distributor apparatus (128). In the preferred embodiment the distributor apparatus (128) is comprised of a cone-shaped distributor plate which is located adjacent to the feedwell (112).

The operation of the second thickener vessel (94) is depicted schematically in FIG. 4. The fine tailings stream (92) enters the second thickener vessel (94) via the feedwell (112), contacts the distributor apparatus (128) and is dispersed throughout the second thickener vessel (94). A flocculent may be added to the second thickener vessel (94) either by pre-mixing the flocculant with the fine tailings stream (92) or by separately adding the flocculant to the second thickener vessel (94) at the feedwell (112) or at some other location.

Fine solid material and some other impurities contained within the fine tailings stream (92) tend to floc together and fall downwards in the second thickener vessel (94) towards the underflow outlet (98) where they may be withdrawn as the underflow component (91). The sloped portion of the sidewall (96) assists in directing the underflow component (91) towards the underflow outlet (98).

Bitumen and other relatively buoyant impurities contained within the fine tailings stream (92) tend to move upwards in the second thickener vessel (94) and move towards the sidewall (96) where they can pass over the weir (126), enter the launder (122) and be withdrawn via the unclarified overflow outlet (106) as the unclarified overflow component (93). The upward movement of the bitumen and other impurities may be assisted by the curtain of gas bubbles provided by the sparge apparatus (120).

Relatively clear water will be stilled by the baffle arrangements (118) and will move toward one of the clarified overflow outlets (102) to be withdrawn from the second thickener vessel (94) as the clarified overflow component (95). Clarification of the clarified overflow component (95) will be enhanced by the curtain of gas bubbles provided by the sparge apparatus (120).

The underflow component (91) may be pumped via the pump (116) for disposal in similar manner to the thickener underflow component (80) obtained during the processing of the bitumen froth stream (30), such as in a tailings pond or similar facility.

The unclarified overflow component (93) may be sent for further clarification to remove and recover the bitumen and other impurities, or it may be recycled to the PSV (28), the separator apparatus (46), the flotation cells (38) or some other equipment or process which does not require heating of the unclarified overflow component (93).

The clarified overflow component (95) may typically be used directly as recycle water for the oil sand extraction process (20) or a related process without risk of fouling heat exchanger or other equipment. One advantage of recycling the clarified overflow component (95) is that valuable energy can be conserved in the overall oil sand processing operation due to the heat retained by the clarified overflow component (95).

The relative proportions of the underflow component (91), the unclarified overflow component (93) and the clarified overflow component (95) withdrawn from the second thickener vessel (94) may be controlled by controlling the volumetric flowrate of the fine tailings stream (92) entering the second thickener vessel (94), the volumetric flowrate of the underflow component (91) withdrawn from the underflow outlet (98) and the volumetric flowrate of the clarified overflow component (95) withdrawn from the clarified overflow outlets (102).

The processes and apparatus of the present invention may be utilized as part of either a continuous or batch process. These processes and apparatus provide means for managing and treating product streams from mineral processing operations, and are particularly suited to the treatment of relatively fine tailings obtained from the bitumen froth stream (30) or the middlings stream (32) resulting from an oil sand extraction process (20).

The embodiments of the invention in which an exclusive property or privilege is claimed are defined as follows:

1. A sealed process for treating a solvent diluted tailings component, comprising heated water, particulate mineral solids, precipitated asphaltenes and residual bitumen and solvent, said component having been derived from bitumen froth by dilution and mixing of the bitumen froth with solvent and separation of the resulting diluted bitumen froth into a diluted bitumen component and said solvent diluted tailings component, comprising:

first subjecting the whole solvent diluted tailings component to a solvent recovery separation by pressure moderation to recover substantially all of the solvent in the solvent diluted tailings component as a separate recovered solvent component and produce a solvent recovered tailings component containing water, solids, precipitated asphaltenes and residual bitumen and solvent;

second subjecting the solvent recovered tailings component to gravity separation to separately produce an overflow stream of clarified heated water and an underflow stream mainly comprising solids, precipitated asphaltenes and water; and recycling at least part of the clarified heated water for re-use in the process.

2. The process as set forth in claim 1, comprising:

subjecting the solvent recovered tailings component to a combination of gravity separation and gas flotation to separately produce the overflow and underflow streams and a third stream comprising residual bitumen and residual solvent.

3. The process as set forth in claim 1, wherein:

the diluted tailings component is subjected in series to separate first and second stages of solvent recovery separation so that each stage produces separate overflow and underflow streams of recovered solvent component and solvent recovered tailings component; and a first part of the first stage underflow is pumped as feed to the second stage and a second part of the first stage underflow is pumped back to the first stage to agitate diluted tailings component undergoing separation in the first stage.

4. The process as set forth in claim 3 wherein:
a first part of the second stage underflow is fed as feed to gravity separation and a second part of the second stage underflow is pumped back to the second stage to agitate diluted tailings component undergoing separation in the second stage.

5. The process as set forth in claim 1, further comprising:
recycling at least part of the clarified heated water to solvent recovery separation.

6. The process as set forth in claim 2, further comprising:
sparging air into the solvent recovered tailings component to enable gas flotation of residual bitumen and residual solvent.

7. The process as set forth in claim 2, wherein:
the diluted tailings component is subjected in series to separate first and second stages of solvent recovery separation so that each stage produces separate overflow and underflow streams of recovered solvent component and solvent recovered tailings component; and
a first part of the first stage underflow is pumped as feed to the second stage and a second part of the first stage underflow is pumped back to the first stage to agitate diluted tailings component undergoing separation in the first stage.

8. The process as set forth in claim 2, further comprising:
recycling at least part of the clarified heated water to solvent recovery separation.

9. The process as set forth in claim 3, further comprising:
recycling at least part of the clarified heated water to solvent recovery separation.

10. The process as set forth in claim 4, further comprising:
recycling at least part of the clarified heated water to solvent recovery separation.

11. The process as set forth in claim 3, further comprising:
sparging air into the solvent recovered tailings component to enable gas flotation of residual bitumen and residual solvent.

12. The process as set forth in claim 4, further comprising:
sparging air into the solvent recovered tailings component to enable gas flotation of residual bitumen and residual solvent.

13. A process for treating a diluted tailings component, comprising heated water, particulate mineral solids, precipitated asphaltenes and residual bitumen and solvent, said component having been derived from bitumen froth by dilution and mixing of the bitumen froth with solvent and separation of the resulting diluted bitumen froth into a diluted bitumen component and said diluted tailings component, comprising:
subjecting at least most of the diluted tailings component to a solvent recovery separation to recover substantially all of the solvent in the diluted tailings component as a separate recovered solvent component and produce a solvent recovered tailings component containing water, solids, precipitated asphaltenes and residual bitumen and solvent; and
thereafter subjecting the solvent recovered tailings component to gravity separation to separately produce an overflow stream of clarified heated water and an underflow stream mainly comprising solids, precipitated asphaltenes and water, the underflow stream comprising most of any residual solvent, solids, and precipitated asphaltenes in the solvent recovered tailings component.

14. The process of claim 13, wherein the clarified heat water is recycled for re-use in the process and wherein the solvent recovered tailings component and underflow stream are free of distillation.

15. The process of claim 13, wherein the subjecting step of the solvent recovered tailings component is performed by pressure moderation.

16. A process, comprising:
(a) separating an oil sand slurry, comprising heated water, particulate coarse and fine solid material, and bitumen and asphaltenes, into first, second, and third product streams, the first product stream comprising most of the bitumen and asphaltenes in the oil sand slurry, heated water and fine solid material, the second product stream comprising fine solid material, and bitumen and asphaltenes, and the third product stream comprising coarse solid material;
(b) contacting the first product stream with a diluent solvent to form a mixture containing precipitated asphaltenes;
(c) thereafter separating the first product stream and diluent solvent mixture into a diluted bitumen component comprising substantially all of the bitumen and diluent solvent in the mixture and a diluted tailings component comprising heated water, fine solid material, precipitated asphaltenes, and residual bitumen and diluent solvent;
(d) recovering substantially all of the diluent solvent from the diluted bitumen component;
(e) subjecting at least most of the diluted tailings component to a solvent recovery separation to recover substantially all of the solvent in the diluted tailings component as a separate recovered solvent component and produce a solvent recovered tailings component containing water, solids, precipitated asphaltenes and residual bitumen and solvent; and
(f) after step (e), subjecting the solvent recovered tailings component to gravity separation to separately produce an overflow stream of clarified heated water and an underflow stream mainly comprising solids, precipitated asphaltenes and water, the underflow stream comprising most of any residual solvent, solids, and precipitated asphaltenes in the solvent recovered tailings component.

* * * * *

UNITED STATES PATENT AND TRADEMARK OFFICE
CERTIFICATE OF CORRECTION

| | | |
|---|---|---|
| PATENT NO. | : 7,569,137 B2 | Page 1 of 1 |
| APPLICATION NO. | : 10/822507 | |
| DATED | : August 4, 2009 | |
| INVENTOR(S) | : Hyndman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 607 days.

Signed and Sealed this

Seventh Day of September, 2010

David J. Kappos
*Director of the United States Patent and Trademark Office*